United States Patent Office 3,096,646
Patented July 9, 1963

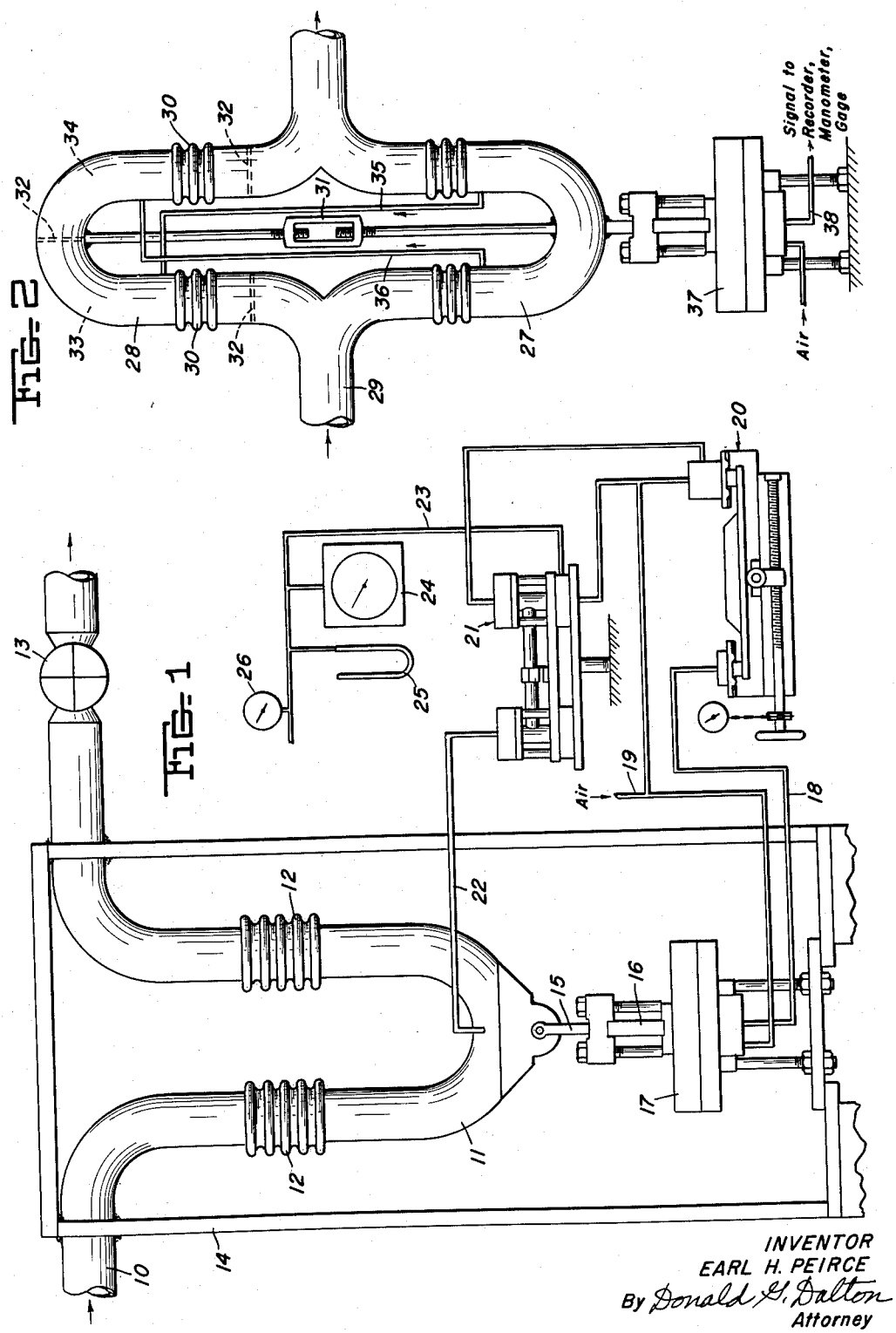

3,096,646
FLOW METER
Earl H. Peirce, Provo, Utah, assignor to United States Steel Corporation, a corporation of New Jersey
Filed Oct. 15, 1959, Ser. No. 846,744
1 Claim. (Cl. 73—228)

This invention relates to a flow meter, i.e., a device for measuring the flow of fluids, and in particular to a flow meter incorporating a floating bent tube such as a U-tube.

Flow meters of the general type to which my invention relates are known (Patents 1,401,299, 2,538,785 and 2,804,771) but have not, to my knowledge, been used to any substantial extent, probably because of difficulties inherent in the known devices. It is accordingly the object of my invention to provide an improved U-tube flow meter operating on a null balance of forces, thereby eliminating springs and bellows which are likely to operate erratically under variable flow and give false indications. I employ instead a force-balance system which automatically sets up a force equal and opposite that caused by the flow of fluid under measurement, and I use this force to actuate indicating or recording means. Movement of the floating U-tube is thus reduced to an almost infinitesimal extent and errors caused by the large movements of the elements of known meters are avoided.

A complete understanding of the invention may be obtained from the following detailed description and explanation which refer to the accompanying drawings illustrating the present preferred embodiment. In the drawings:

FIGURE 1 is a diagrammatic view showing a preferred form of the invention; and

FIGURE 2 is a similar view of a modification with parts omitted.

Referring now in detail to the drawings and, for the present, to FIGURE 1, a conduit 10 conveying fluid includes a floating U-tube 11 connected thereto by bellows 12, and a control valve 13. The portion of the conduit in which the U-tube is connected is suspended from a supporting yoke or frame 14 mounted on any suitable base. The mid-point of the U-tube is connected by a link 15 to the control member 16 of a force-balance device indicated generally at 17, mounted at the bottom of yoke 14 on adjusting screws. One example of such a device is the "Thrus Torq" pneumatic force-measuring balance manufactured by Hagan Chemicals and Controls, Inc., Pittsburgh, Pennsylvania. This device operates in a known manner to deliver an air-pressure signal to an outlet pipe 18, proportional to the force applied to member 16 and, at the same time to apply an opposing force to the latter restoring it to original position. The device acts instantly so almost no movement of member 16 is involved. Air under suitable pressure is supplied thereto through a supply pipe 19 from any convenient source.

The pressure signal from device 17 is applied to one side of an adjustable-ratio relay 20 such as Model LO made by Hagan Chemicals and Controls, Inc. This device is connected to pipe 19 and applies an amplified signal to one side of a ratio totalizer 21 such as that made by Hagan Chemicals and Controls, Inc. This device modifies the amplified signal in accordance with the static pressure in tube 11, applied through a connection 22. It is connected to supply pipe 19 and has an output line 23 extending to a recorder 24, a manometer 25 and a gage 26.

It will be evident that, when valve 13 is opened to permit the flow of fluid through pipe 10, U-tube 11 will float by virtue of bellows 12, between the right-angle bends in the pipe secured to yoke 14, and balance 17. Any change in flow through pipe 10 creates a tendency for tube 11 to shift vertically. Any movement thereof causes a compensating change in the opposing force exerted by the balance 17 and a corresponding change in its pressure signal. This signal, after being amplified by relay 20 and modified by totalizer 21 is communicated to the recorder, manometer and gage. The latter thus record and indicate the flow through pipe 10 at all times.

A simplified modification shown in FIGURE 2 includes a double U-tube 27, 28 connected in a pipe 29, each U-tube being connected to branches in the pipe througth bellows 30. A turnbuckle 31 extends between the midpoints of the U-tubes. Tube 28 is divided by partitions 32 into static pressure chambers 33 and 34. Flexible connections 35 and 36 extend to these chambers from the exit and entrance ends, respectively, of U-tube 27. The latter has its mid-point connected to a force-balance device 37 similar to that shown at 17. A signal pipe 38 extends therefrom to a recorder, gage, etc., as in FIGURE 1.

The pressure signal from device 37 represents the true rate of flow accurately at all times. The cross connections 35 and 36 provide automatic compensation for the effect of static pressure on U-tube 27. In the system of FIGURE 2, the U-tubes connected by turnbuckle 31 constitute essentially a free body with respect to forces resulting from fluid flow and this contributes to a high degree of accuracy.

It will be apparent that both the systems shown in FIGURES 1 and 2 have the advantage of generating a signal pressure without involving more than the minutest movement of the floating U-tube. I thus avoid the errors inherent in the operation of links and springs or other types of mechanical movement heretofore employed to translate motion of the U-tube into movement of an indicator.

Instead of a U-tube, an L or other angled tube may be employed to create a force proportional to the rate of flow of fluid.

Although I have disclosed herein the preferred embodiment of my invention, I intend to cover as well any change or modification therein which may be made without departing from the spirit and scope of the invention.

I claim:

A system for measuring the flow rate of fluid through a pipe comprising a pair of substantially identical U-tubes connected in branching and returning relation to said pipe and extending in opposite directions therefrom, each leg of both tubes including a bellows whereby the tubes are floatingly supported from said pipe, means rigidly connecting the U-tubes together, partitions dividing one U-tube symmetrically into two static-pressure chambers one on each side of the point of connection of said means, pipes cross connecting said chambers, respectively, with the entrance and exit ends of the other tube, pneumatic force-balance means connected to the bend of said other tube, and indicating means responsive to the output of said force-balance means.

References Cited in the file of this patent
UNITED STATES PATENTS

| | | |
|---|---|---|
| 1,401,299 | Wohlenberg | Dec. 27, 1921 |
| 2,538,785 | Karig | Jan. 23, 1951 |
| 2,628,499 | Kleiss | Feb. 17, 1953 |
| 2,632,329 | Zuehlke | Mar. 24, 1953 |
| 2,742,784 | Brous | Apr. 24, 1956 |
| 2,804,771 | Brown | Sept. 3, 1957 |

OTHER REFERENCES

Pages 32, 33 from text, Principles of Aeronautics by Dwinnell, published in 1949 by McGraw-Hill. (Copy available in Division 36 (JGM).)